July 7, 1931.  E. CLARK  1,813,528
PIPE COUPLING AND SUPPORT
Filed March 5, 1925
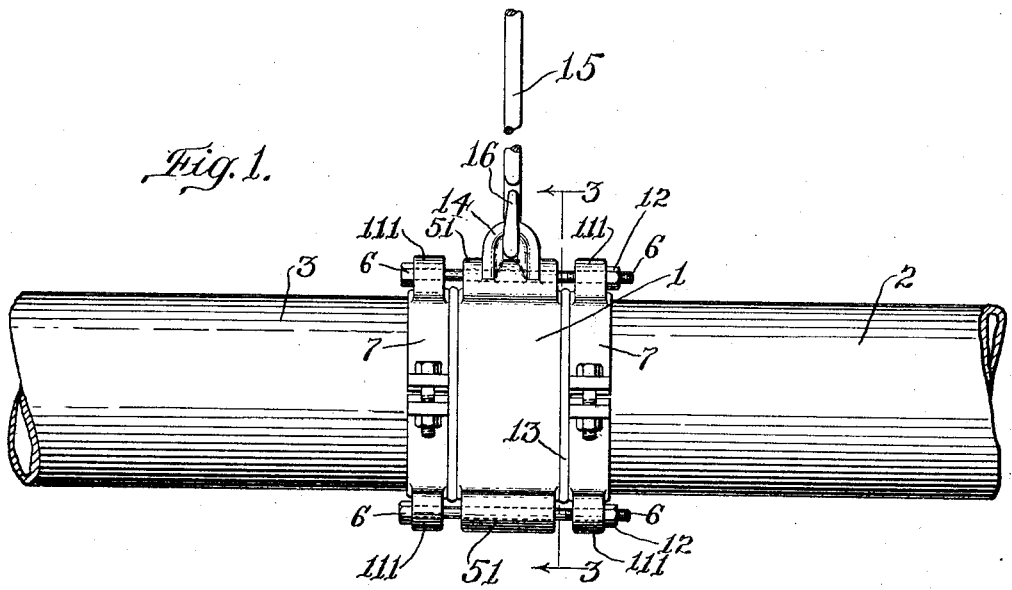
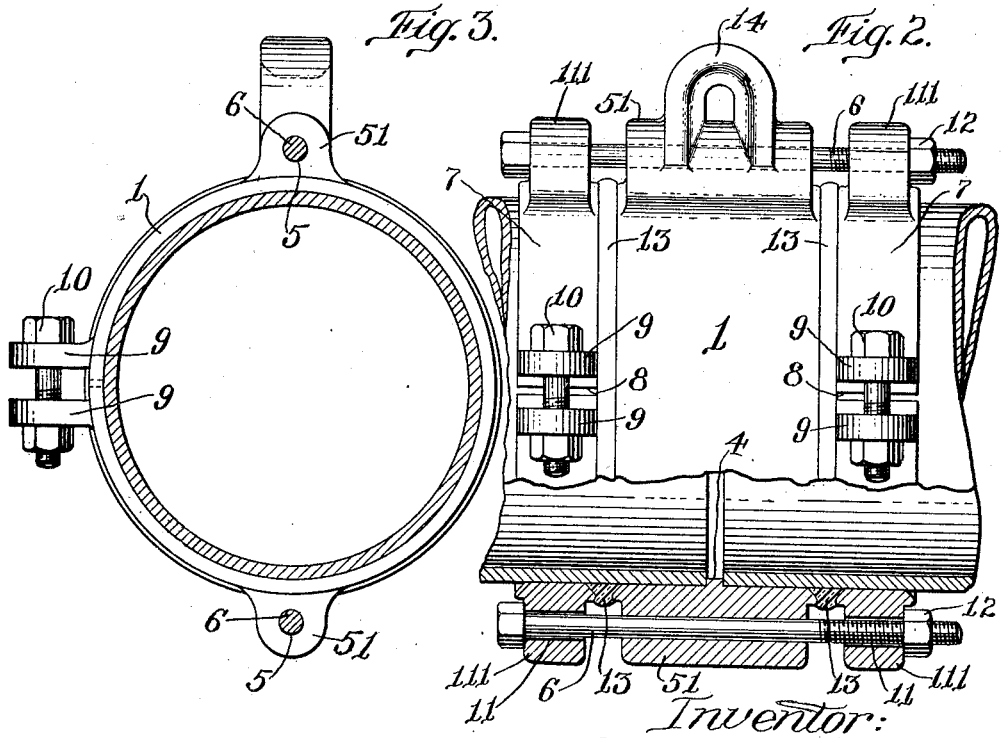

Patented July 7, 1931

1,813,528

UNITED STATES PATENT OFFICE

ERNEST CLARK, OF ABINGTON, MASSACHUSETTS, ASSIGNOR TO ABINGTON TEXTILE MACHINERY WORKS, OF BOSTON, MASSACHUSETTS, A TRUST OF MASSACHUSETTS

PIPE COUPLING AND SUPPORT

Application filed March 5, 1925. Serial No. 13,053.

The invention has relation to pipe-couplings, and consists in an improved device of this class adapted to connect together abutting pipe-ends. The invention also provides support for the joint thus formed.

One general object of the invention is to produce a joint which shall be effective, without the necessity of screw-threading the pipes or the coupling. Another is to provide a tight sealed joint which shall be effective against leakage of air or other fluid in case of use under circumstances involving difference of pressure between the interior and the exterior of a pipe. An example of such use is in connection with the pipe system of a pneumatic cleaning apparatus, such as a vacuum system for stripping dirt, short fibers, etc., from the toothed wire-clothed surfaces of the cylinders of carding engines. A third object of the invention is to prevent pipe deflection by the weight of the coupling and that of the pipes intermediate other supports.

An illustrative embodiment of the principles of the invention is shown in the accompanying drawings, in which latter,—

Fig. 1 is a view illustrating the coupling and hanger to which reference is made hereinafter, in connection with the meeting ends of two lengths of pipe.

Fig. 2 is a side view, partly broken away, of the coupling and the pipe ends, on a larger scale.

Fig. 3 is a view in section on line 3—3 of each of Figs. 1 and 2.

The coupling comprises essentially a fitting 1, rings 7, 7, at opposite sides thereof affixed to the meeting end-portions of the pipes 2 and 3, and means for drawing the said rings toward the ends of the fitting and thus toward each other. Preferably packings or gaskets are employed as hereinafter explained.

The fitting 1 is constructed to receive the meeting ends of the two pipes 2 and 3, and to fit easily but closely over the said ends. Preferably, it is formed with an internal annular shoulder 4, Fig. 2, to serve as a stop for the entered pipe-ends, to insure the fixture's being centered over the joint. Holes 5, 5, parallel with the axis of the fitting, are made through outer portions of the fitting, in this instance through oppositely located lugs 51, 51, which are provided upon the exterior of the fitting. These holes receive the bolts 6, 6, which engage also with the rings 7, 7. Such rings are applied to the exteriors of the pipes 2 and 3. In order to provide for engaging them with the pipes they are split as at 8, 8, Fig. 2, so that they may be expanded and contracted somewhat. At opposite sides of the slit 8 of a ring its meeting portions are formed with lugs 9, 9, through holes in which passes a bolt 10 serving as a means of tightening and clamping the rings fixedly in place upon the corresponding pipes. The rings are also provided with bolt-holes 11, 11, Fig. 2, therethrough which register with those of the fitting 1, so that the bolts 6, 6, may be passed through these bolt-holes and through those in the said fitting, and will serve to draw the pipe-ends toward each other and seat them firmly against opposite sides of the internal annular shoulder 4 of the fitting when the nuts 12, 12, are applied to the threaded stems of the bolts and tightened. In this instance the holes 11, 11, are formed in oppositely-located lugs 111, 111, at the exterior of the respective rings.

In practice, to insure an air-tight joint, packing 13 is applied to each pipe-end between the corresponding ring 7 and the adjacent end of the fitting 1.

In assembling the coupling, first a split ring 7 and then a packing ring 13 are applied to the end of each pipe. The two pipe-ends are then entered into the fitting 1 usually nearly to but not quite against shoulder 4. Then each ring 7 and the adjacent packing 13 are pushed up close to the corresponding end of the fitting, and the bolts 10, 10, are tightened to clamp the split rings 7, 7, tightly in place upon the pipe-ends. Then the bolts 6, 6, are applied and adjusted to draw the rings 7, 7, and the pipe-ends, toward the fitting 1. This tightening operation is continued until the two pipe-ends are both in engagement with the opposite sides of the shoulder 4, and also until the rings 7, 7, have been caused to slip sufficiently upon the exteriors of the pipes 2 and 3 to compress the packing rings between the said rings and the ends of the fitting 1 so as to fit snugly against the surfaces of the pipes and effectually seal the joint.

In order to provide for pressing the material of the packing rings inwardly toward the surfaces of the pipes as the bolts 6, 6, are tightened, so as to insure snug fitting of said packing against the said surfaces, and effectual and complete sealing of the joint, I chamfer inwardly the proximate edges of the rings 7, 7, and of the fitting 1, as shown in Fig. 2, whereby as the rings are drawn toward the ends of the fitting the beveled surfaces of said edges operate to crowd the said material inward.

The described coupling is especially designed and adapted to be used in connection with light sheet-iron pipe which is too thin to permit its being screw-threaded and fitted together in the usual manner.

The pipe-coupling above described is shown as having combined therewith means for supporting the assembly of pipes and coupling at the joint to prevent deflection at the joint under the weight of the parts themselves, or that of the contents of the pipes in case such contents should have appreciable weight, or for the broader purpose of providing means for supporting the pipe-line in its desired position. The said means comprises a hanger, in this instance constituted by a supporting rod 15, the fitting 1 being formed with an eye 14, preferably formed integrally with the fitting, and the said hanger or supporting rod 15 being formed with a hook 16 that engages with said eye 14. In practice the upper portion of the hanger or supporting rod is secured to an overhead structure, such as the ceiling or roof of the room or building within which the pipe-line is located. Through the engagement of the pipe-fitting, at the lugs, with the bolts 6, 6, and of the latter with the rings 7, 7, the bolts are utilized for the support of the pipes 2, 3, adjacent the meeting ends of the pipes.

In the illustrated embodiment of the invention the eye 14 is provided in connection with one of the lugs 51, and in the use of the coupling such eye is located at the top of the assembled pipes and coupling. The other lug 51 being located opposite that which is provided with the eye 14, it follows that in use the lugs 51, 51, of the fitting, the lugs 111, 111, of the split rings, and the binding bolts 6, 6, are disposed at the top and the bottom of the joint.

What is claimed as my invention is,—

1. The combination with a pipe-fitting having external lugs and pipes each having an end-portion thereof inserted within said pipe-fitting, of a ring separately clamped upon the exterior of each pipe, packing between each ring and the pipe-fitting, bolts engaging with said rings for drawing the pipes endwise toward each other and also compressing the packing between the rings and the fitting, and means carried by said pipe-fitting to be engaged by a supporting member to support the same and thereby the pipes at the joint, said lugs engaging with said bolts to utilize the latter and the rings in supporting the pipes adjacent the meeting ends thereof.

2. The combination with a pipe-fitting having external lugs, and pipes each having an end-portion thereof inserted within said pipe-fitting, of a separate split ring grippingly clamped upon the exterior of each pipe so as to draw the pipes endwise toward each other within the fitting, packing between the ring and the corresponding end of the pipe-fitting, and bolts engaging with said external lugs and with the rings, adapted when tightened to draw the opposed ends of the pipes home within the pipe-fitting, and thereafter to slide the rings along the pipes to compress the packing, and to hold the pipe-fitting and rings together, with the packing confined between them.

3. The combination with a pipe-fitting having external lugs, and pipes each having an end-portion thereof inserted within said pipe-fitting, of a separate split ring grippingly clamped upon the exterior of each pipe so as to draw the pipes endwise toward each other within the fitting, packing between the ring and the corresponding end of the pipe-fitting, and bolts engaging with said external lugs and with the rings, adapted when tightened to draw the opposed ends of the pipes home within the pipe-fitting, and thereafter to slide the rings along the pipes to compress the packing, and to hold the pipe-fitting and rings together, with the packing confined between them, and means carried by said pipe-fitting to be engaged by a supporting member to support the same and thereby the pipes at the joint.

ERNEST CLARK.